US011376760B2

(12) United States Patent
Takeuchi et al.

(10) Patent No.: US 11,376,760 B2
(45) Date of Patent: Jul. 5, 2022

(54) KNEADING DISC HAVING BAND PORTION WITH BENT PART, SCREW ELEMENT AND EXTRUDER

(71) Applicant: The Japan Steel Works, Ltd., Tokyo (JP)

(72) Inventors: Takahide Takeuchi, Hiroshima (JP); Motoi Nakamura, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 583 days.

(21) Appl. No.: 16/317,202

(22) PCT Filed: Mar. 28, 2017

(86) PCT No.: PCT/JP2017/012575
§ 371 (c)(1),
(2) Date: Jan. 11, 2019

(87) PCT Pub. No.: WO2018/012046
PCT Pub. Date: Jan. 18, 2018

(65) Prior Publication Data
US 2019/0240867 A1 Aug. 8, 2019

(30) Foreign Application Priority Data
Jul. 13, 2016 (JP) .............................. JP2016-138524

(51) Int. Cl.
*B29B 7/42* (2006.01)
*B29B 7/48* (2006.01)
*B29C 48/47* (2019.01)

(52) U.S. Cl.
CPC ................ *B29B 7/421* (2013.01); *B29B 7/42* (2013.01); *B29B 7/429* (2013.01); *B29B 7/483* (2013.01); *B29B 7/489* (2013.01); *B29C 48/47* (2019.02)

(58) Field of Classification Search
CPC ........... B29B 7/421; B29B 7/42; B29B 7/489; B29B 7/483; B29B 7/429; B29B 7/482; B29B 7/481; B29C 48/47; B29C 48/57
See application file for complete search history.

(56) References Cited

U.S. PATENT DOCUMENTS 6,116,770 A * 9/2000 Kiani ...................... B29B 7/483
366/82
6,241,375 B1 * 6/2001 Wang .................... B29C 48/565
366/82

(Continued)

FOREIGN PATENT DOCUMENTS

CN 205202104 U 5/2016
EP 0 532 903 A1 3/1993

(Continued)

OTHER PUBLICATIONS

"Twin Screw Extruders & Its Application", Chinese Light Industry Publications, Jan. 2003, pages (6 total) including partial English translation of the office action explaining relevance to foreign-language reference.

(Continued)

*Primary Examiner* — Charles Cooley
(74) *Attorney, Agent, or Firm* — Foley & Lardner LLP

(57) ABSTRACT

Mixing performance of resin material in the rotational direction of the screw is enhanced. Kneading disc 7 is fitted onto rotatable shaft 3 and is arranged in cylinder 2. Outer circumferential surface 8 of kneading disc 7 of the present invention that faces cylinder 2 has band portion 9 that extends between both ends 7a, 7b of kneading disc 7 in axial direction X of shaft 3 and that forms a minimum gap with cylinder 2. Band portion 9 includes at least one bent part 10.

10 Claims, 7 Drawing Sheets

(56) References Cited

U.S. PATENT DOCUMENTS

| | | | |
|---|---|---|---|
| 2005/0270894 A1* | 12/2005 | Gates | B29C 48/2564 |
| | | | 366/82 |
| 2007/0177451 A1 | 8/2007 | Benjamin et al. | |
| 2009/0097350 A1 | 4/2009 | Fukutani et al. | |
| 2010/0296360 A1 | 11/2010 | Inagawa et al. | |
| 2012/0146292 A1 | 6/2012 | Ikeda et al. | |
| 2012/0182823 A1 | 7/2012 | Burkhardt | |

FOREIGN PATENT DOCUMENTS

| | | |
|---|---|---|
| JP | 2001-260208 A | 9/2001 |
| JP | 2003-211440 A | 7/2003 |
| WO | WO-2017/084646 A1 | 5/2017 |

OTHER PUBLICATIONS

Office Action dated Mar. 1, 2021 in counterpart Chinese Appl. 201780042746.0 with English-language translation (10 pgs.).

* cited by examiner

KNEADING DISC HAVING BAND PORTION WITH BENT PART, SCREW ELEMENT AND EXTRUDER

CROSS-REFERENCE TO RELATED APPLICATIONS

This application is a national stage entry of International Application No. PCT/JP2017/012575, filed Mar. 28, 2017; which claims priority to Japanese Application No. 2016-138524, filed Jul. 13, 2016; the contents of both of which are incorporated by reference herein in their entirety.

TECHNICAL FIELD

The present invention relates to a kneading disc, a screw element using the same and an extruder, and particularly to the structure of the kneading disc.

BACKGROUND ART

An extruder that is used for a mixing process or a devolatilizing process of thermoplastic resin material has a screw that is fitted onto a shaft, and the screw is partitioned in the axial direction of the shaft depending on function. Specifically, a screw that mainly conveys resin material is provided at a feeder of the resin material, and a screw that plasticizes and mixes the resin material is provided on the downstream thereof, and a screw that conveys the mixed resin material toward a die is provided on the downstream thereof. Among these screws, the screw that plasticizes and mixes the resin material is typically a so-called kneading disc type screw, in which a plurality of kneading discs is arranged in the axial direction of the shaft.

JP2001-260208 discloses a kneading disc having a substantially oval cross section. In the outer circumferential surface of the kneading disc that faces the cylinder, edge surfaces that are positioned on the longitudinal axis are closer to the cylinder than the other edge surfaces. This enables a strong mixing performance at the edge surfaces on the longitudinal axis. JP2003-211440 discloses a kneading disc having a similar cross section. In this kneading disc, edge surfaces on the longitudinal axis form band portions that are tilted with respect to the axial direction of the shaft. Resin material receives conveying force from the band portion not only in the circumferential direction of the cylinder but also in the axial direction thereof. This allows the resin material to flow in a complicated manner and enhances mixing performance.

SUMMARY OF INVENTION

In the kneading disc disclosed in JP2001-260208, resin material is mixed substantially in the rotational direction of the screw because the edge surface extends in a direction parallel to the axial direction of the shaft. Therefore, the resin material moves rather simply and there is room for improvement in mixing function. In the kneading disc disclosed in JP2003-211440, resin material is pushed in a direction perpendicular to the band portions, and a part of the force contributes to the mixing function in the rotational direction of the screw. However, the mixing action in the rotational direction of the screw is not largely different from that of the kneading disc disclosed in JP2001-260208 and there is still room for improvement.

The present invention aims at providing a kneading disc having improved mixing function for resin material in the rotational direction of the screw.

A kneading disc of the present invention is fitted onto a rotatable shaft and is arranged in a cylinder. An outer circumferential surface of the kneading disc of the present invention that faces the cylinder has a band portion that extends between both ends of the kneading disc in an axial direction of the shaft and that forms a minimum gap with the cylinder, and the band portion includes at least one bent part. Resin material is pushed in different directions along the band portion and mixed in a complicated manner due to the bent part of the band portion.

Thus, accordingly to the resin material present invention, it is possible to provide a kneading disc having improved mixing function for resin material in the rotational direction of the screw.

LIST OF REFERENCE NUMERALS

Figure 1:
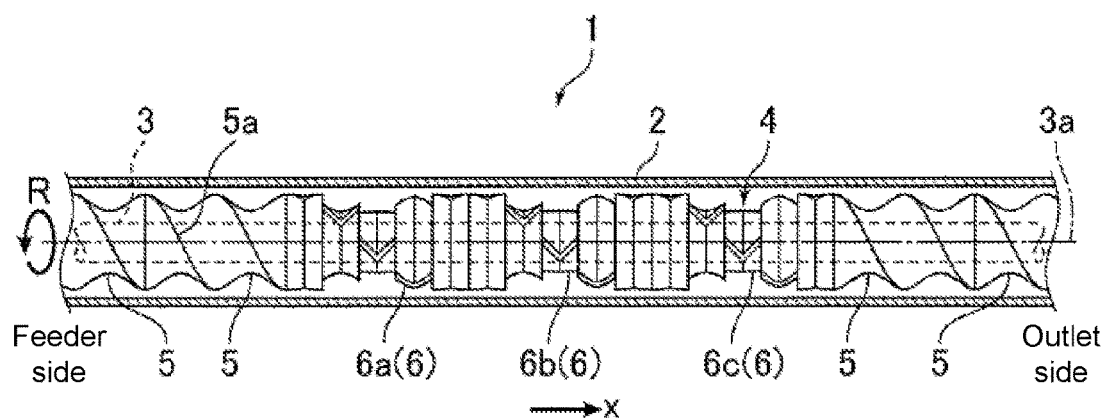
FIG. 1 is a schematic front view of an extruder of a first embodiment.

1 Extruder
2 Cylinder
3 Shaft
4 Screw
5 Screw element
6, 6a-6c Screw element
7 Kneading disc
8 Outer circumferential surface of the kneading disc
9, 19, 29 Band portion
9a First part
9b Second part 10 Bent part
R Rotational direction
X Axial direction

DESCRIPTION OF EMBODIMENTS

With reference to the drawings, embodiments of the present invention will be described. The extruder of the present embodiments is a twin screw extruder, but the invention may also be applied to a single screw extruder or a multi screw extruder. In the following description, "axial direction" means the axial direction of a shaft. "The axial direction" corresponds to the axial direction of a screw and the axial direction of a cylinder. "Circumferential direction" means a direction along the outer circumference of the screw and perpendicular to the axial direction. "The circumferential direction" includes both the rotational direction of the shaft and a direction opposite thereto.

FIG. 1 shows a sectional view of an extruder according to an embodiment of the present invention. Extruder 1 includes cylinder 2, two rotatable shafts 3 that extend in parallel to each other (only one shaft 3 is illustrated in FIG. 1) and screws 4 that are fitted onto shafts 3. Shafts 3 and screws 4 are arranged in cylinder 2. Screw 4 is held by shaft 3 via an appropriate means, such as a spline coupling, with being prevented from rotating relative to shaft 3. Shaft 3 is rotatarily driven about central axis 3a in direction R by means of a motor (not illustrated). Resin material is fed from a feeder (not illustrated) that is arranged on the upstream side of cylinder 2, is mixed while being conveyed in cylinder 2, and flows out at an outlet (not illustrated) that is connected to a die. Screw 4 is partitioned into a plurality of screw elements in axial direction X. A plurality of conveying screw elements 5 having spirally extending flights 5a is provided near the feeder and the outlet, respectively, and a plurality of mixing screw elements 6 having kneading discs is provided between the feeder and the outlet. In the present embodiment, three mixing screw element 6a to 6c are provided, but the number of mixing screw elements 6 is not limited to three. Mixing screw elements 6a to 6c have the same configuration. Conveying screw element 5 has a function to mainly convey resin material in axial direction X. Mixing screw element 6 has a function to mainly mix the resin material. Specifically, mixing screw element 6 exerts a large pressure and a large shear force both on resin material and on additives that are to be mixed with the resin material. Screw configurations that are suitable to various processes can be obtained by changing screw elements 5 and 6.

Figure 2A:
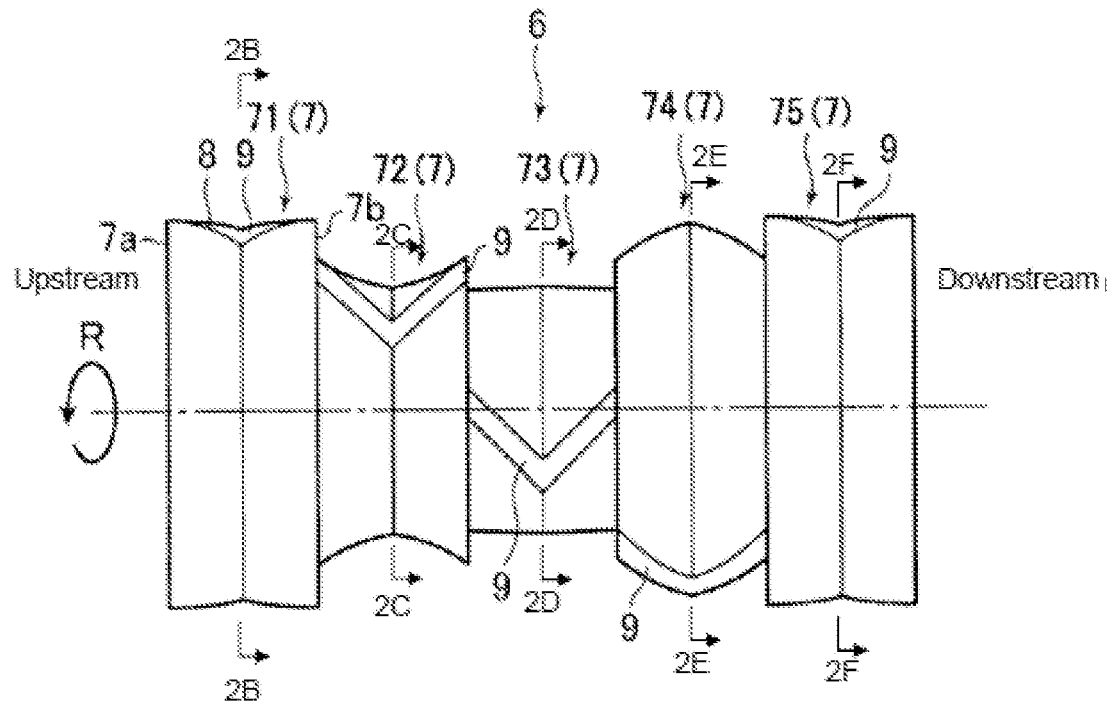
FIG. 2A is a schematic front view of a kneading disc of the extruder shown in FIG. 1.
Figure 2B:
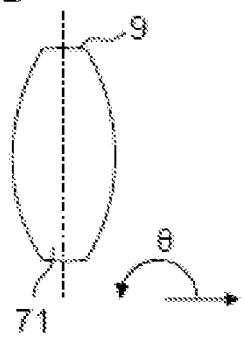
FIG. 2B is a sectional view cut along line 2B-2B in FIG. 2A.
Figure 2C:
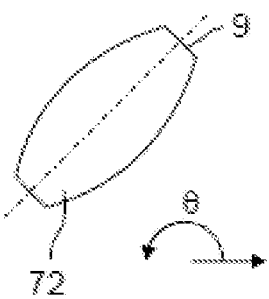
FIG. 2C is a sectional view cut along line 2C-2C in FIG. 2A.
Figure 2D:
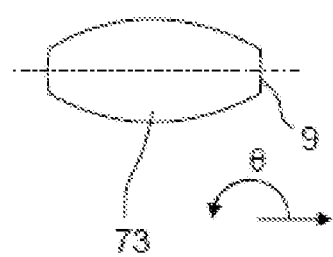
FIG. 2D is a sectional view cut along line 2D-2D in FIG. 2A.
Figure 2E:
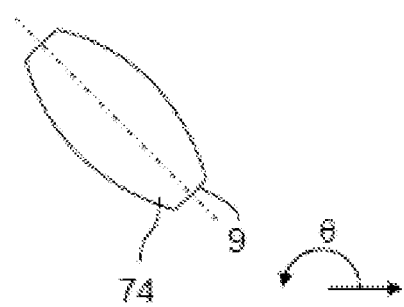
FIG. 2E is a sectional view cut along line 2E-2E in FIG. 2A.
Figure 2F:
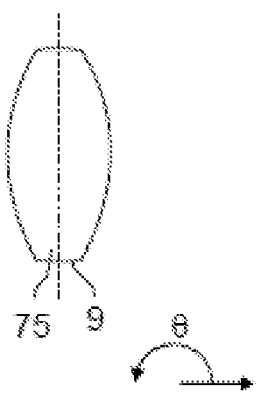
FIG. 2F is a sectional view cut along line 2F-2F in FIG. 2A.

FIG. 2A shows a front view of mixing screw element 6, as viewed in the same direction as FIG. 1. Each mixing screw element 6 consists of a plurality of kneading discs 7 that are arranged in axial direction X. Kneading discs 7 are integrated with each other in axial direction X, constituting a single mixing screw element 6. The thickness (the dimension in axial direction X) of kneading disc 7 is 0.05 to 2 times as large as the maximum diameter of kneading disc 7, and the number of kneading disc 7 is between 2 and 30. It should be noted that one kneading disc 7 may constitute one screw element 6. The maximum radius of kneading disc 7 (½ of the maximum diameter mentioned above) is equal to the distance between the center of shaft 3 and the outer circumferential surface of a band portion, described later.

Figure 3A:
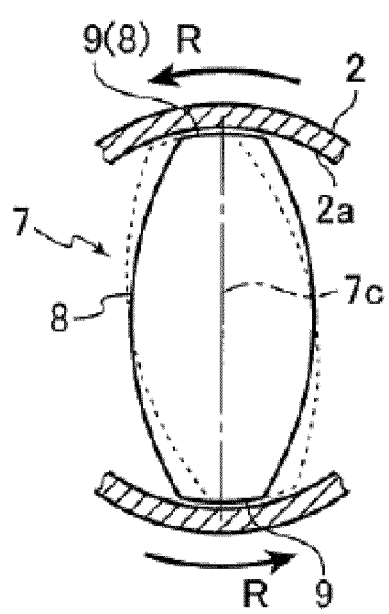
FIG. 3A is a side view of the kneading disc shown in FIG. 2A.
Figure 3B:
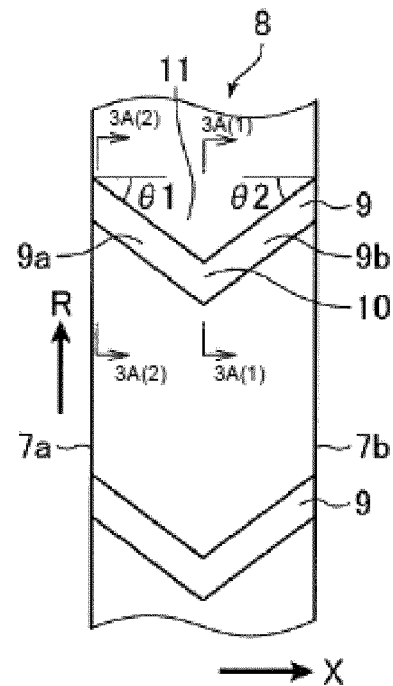
FIG. 3B is a developed view of the outer circumferential surface of the kneading disc shown in FIG. 3A.

FIG. 3A, 3B shows each kneading disc 7. FIG. 3A is a side view of kneading disc 7, as viewed from the feeder of the resin material in axial direction X, and FIG. 3B is a developed view of the outer circumferential surface of kneading disc 7 that faces cylinder 2. In FIG. 3A, the solid line shows a sectional view along line 3A(1)-3A(1) as shown in FIG. 3B that passes through the center of kneading disc 7 with regard to axial direction X in FIG. 3B. In FIG. 3A, the dashed line shows a sectional view along line 3A(2)-3A(2) as shown in FIG. 3B that passes through an end of kneading disc 7 with regard to axial direction X in FIG. 3B.

As shown in FIG. 3A, kneading disc 7 has a substantially oval shape. Kneading disc 7 has outer circumferential surface 8 that faces cylinder 2. Outer circumferential surface 8 of kneading disc 7 has two band portions 9 that extend between both ends 7a, 7b of kneading disc 7 with regard to axial direction X and that form minimum gaps with cylinder 2. Band portions 9 are arranged at two positions on longitudinal axis 7c of kneading disc 7 that are opposite to each other on outer circumferential surface 8. The minimum gap means that the gap with cylinder 2 at a certain position is smaller than gaps at positions in front of and at the back of the position in the circumferential direction. The outer circumferential surface of band portion 9 is in the form of an arc that is coaxial with inner surface 2a of cylinder 2, and the gap between band portion 9 and inner surface 2a of cylinder 2 is constant at any position in the circumferential direction. Band portion 9 may also be planar. Outer circumferential surface 8 has a larger radii of curvature than band portions 9 of kneading disc 7 between two band portions 9.

As shown in FIG. 3B, band portion 9 has a single bent part 10 that is positioned at the central part thereof in axial direction X. Bent part 10 is a part where a part of band portion 9 forms an angle other than zero degrees with another part thereof that is adjacent to the former. Band portion 9 has first part 9a that extends diagonally relative to axial direction X and second part 9b that is connected to first part 9a at bent part 10 and that extends diagonally relative to axial direction X and in a direction opposite to first part 9a with regard to axial direction X. First part 9a and second part 9b have straight shapes, and bent part 10 is a point of intersection of first part 9a with second part 9b. First part 9a extends from one end 7a with regard to axial direction X in a direction opposite to rotational direction R, and second part 9b extends to another end 7b in the same direction as rotational direction R. As a result, band portion 9 forms pocket 11, which is partially surrounded by band portion 9, in front of band portion 9 or bent part 10 with regard to rotational direction R of shaft 3.

First part 9a and second part 9b are in symmetry with each other with regard to the circumferential direction. Both acute angle θ1 that is formed between first part 9a and axial direction X and acute angle θ2 that is formed between second part 9b and axial direction X are preferably 30 degrees or more and less than 90 degrees.

Figure 4A:
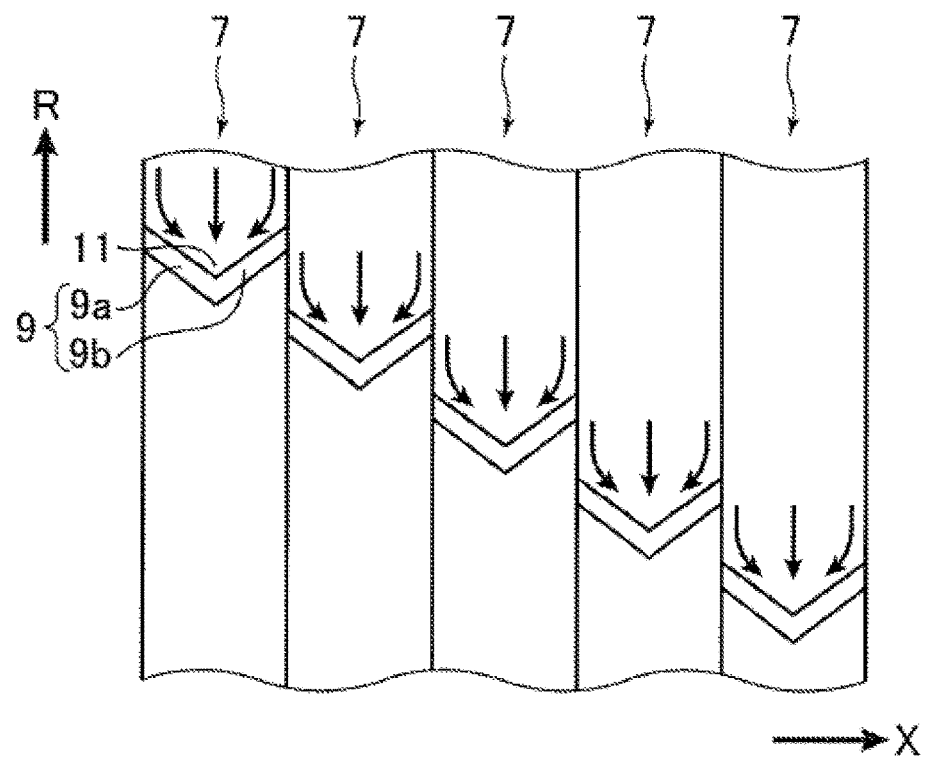
FIG. 4A is a view conceptually illustrating the flow of resin material in the embodiment.
Figure 4B:
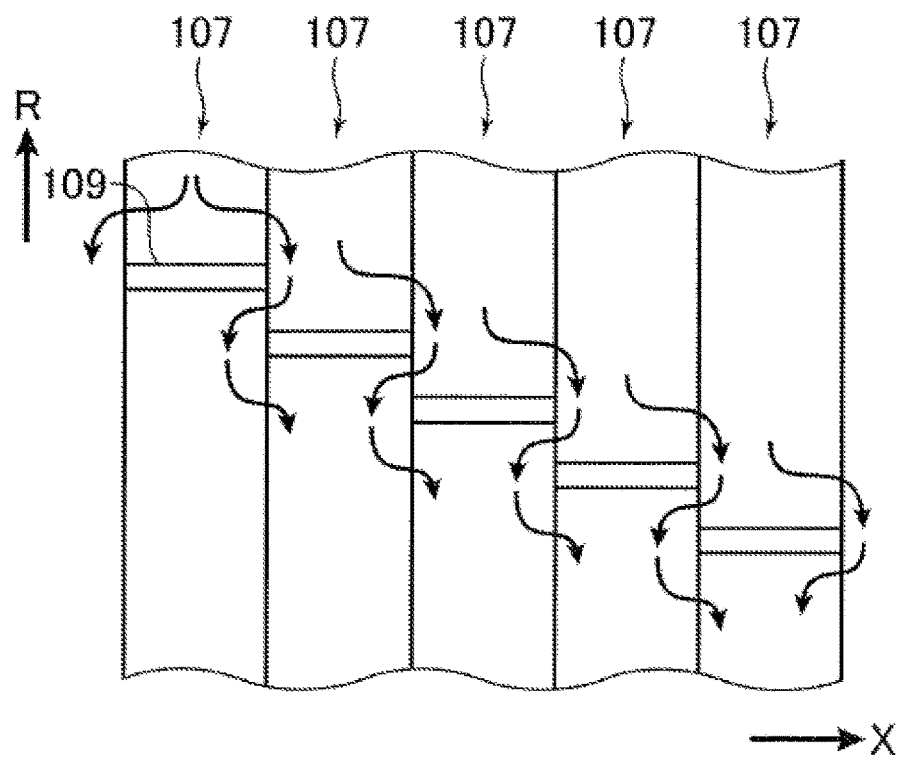
FIG. 4B is a view conceptually illustrating the flow of resin material in a comparative example.

FIGS. 4A and 4B are developed views similar to FIG. 3B, illustrating mixing screw element 6 of the present embodiment and a mixing screw element of a comparative example, respectively. Only one of band portions 9 of each kneading disc 7 is shown in FIG. 4A, and only one of band portions 109 of each kneading disc 107 is shown in FIG. 4B, but the other band portion 9, 109 have the same configuration. When shaft 3 is rotated in rotational direction R, resin material receives shear force between screw 4 and inner surface 2a of cylinder 2 (see FIG. 3A) and receives plasticizing and mixing action. Especially, when resin material passes through band portion 9, 109 where the gap between screw 4 and cylinder 2 is narrowed, resin material receives a large shear force. Resin material flows between fixed inner surface 2a of cylinder 2 and rotating screw 4 such that the resin material is pushed by rotating screw 4 and rides over band portion 9. In kneading disc 7 of the present embodiment shown in FIG. 4A, resin material flows, as shown by the arrows. Specifically, resin material near first part 9a, when coming into contact with first part 9a, flows diagonally with respect to the circumferential direction along first part 9a toward the center in axial direction X (the center of pocket 11). Resin material near second part 9b, when coming into contact with second part 9b, flows diagonally with respect to the circumferential direction along second part 9b toward the center in axial direction X. The resin material near first part 9a and the resin material near second part 9b flow in directions opposite to each other with respect to axial direction X. Resin material near bent part 10 flows substantially in the circumferential direction toward the center in axial direction X (the center of pocket 11). As a result, the resin material is gathered toward pocket 11 from different directions and is further conveyed toward the back side of pocket 11 as shaft 3 is rotated. This allows the resin material to receive a strong compression force.

In kneading disc 107 of the comparative example shown in FIG. 4B, resin material receives shear force in the circumferential direction from band portion 109 that extends straight, but as shown by the arrows, the resin material easily escapes from the ends of band portion 109, and the resin material cannot be efficiently captured. On the other hand, in kneading disc 7 of the present embodiment, resin material is efficiently gathered to pocket 11 while being compressed, and receives further stronger compressing action and shear action at a gap between cylinder 2 and band portion 9 that is adjacent to pocket 11 on the backside of pocket 11 with regard to rotational direction R. In this manner, the mixing performance of resin material can be enhanced.

Similar phenomenon occurs at adjacent kneading disc 7, where resin material flows in a complicated manner due to the shear force that is applied to the resin material in the circumferential direction and in axial direction X. As a result, the plasticizing and mixing performance of resin material can be enhanced.

Figure 3C:
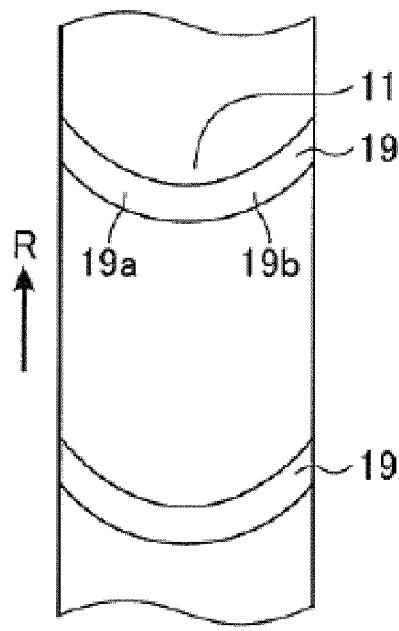
FIG. 3C is a view similar to FIG. 3B, illustrating another embodiment of the band portion.

FIG. 3C shows another embodiment of the band portion. Band portion 19 has a generally curved shape, and numberless bent parts exist in axial direction X. Both first part 19a and second part 19b extend in curves. Band portion 19 is generally bent in the same direction and does not have a point of inflection. Thus, in the same manner as the embodiment shown in FIG. 3B, a single pocket 11 is formed near the center in axial direction X. Resin material is mixed while receiving shear force from different directions depending on the position in axial direction X. Accordingly, a high mixing performance can be obtained in this embodiment.

Figure 3D:
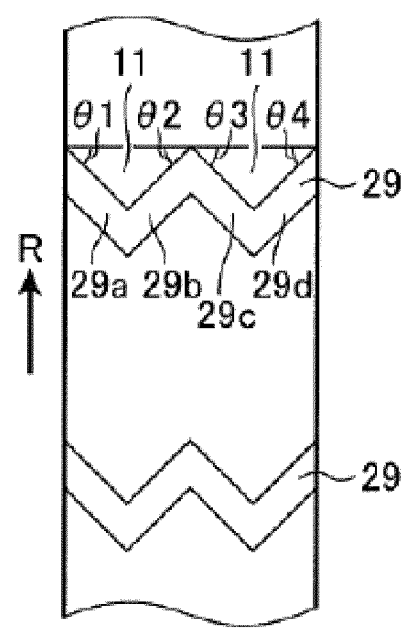
FIG. 3D is a view similar to FIG. 3B, illustrating another embodiment of the band portion.

FIG. 3D shows yet another embodiment of the band portion. Band portion 29 has four parts (first to fourth parts 29a-29d) that alternately change directions. Pockets 11 are formed between first part 29a and second part 29b and between third part 29c and fourth part 29d, respectively. First to fourth parts 29a-29d extend straight. Angles (acute angles) θ1 to θ4 that are formed between first to fourth parts 29a-29d and axial direction X, respectively, are the same, but may be different from each other. In this embodiment, resin material is mixed while receiving shear force from different directions depending on the position in axial direction X, and a high mixing performance can be obtained.

FIGS. 2B to 2F are sectional views along line 2B-2B, line 2C-2C, line 2D-2D, line 2E-2E and line 2F-2F in FIG. 2A, respectively, conceptually illustrating the positions of band portions 9 in each kneading disc 7. Specifically, these figures conceptually illustrate the cross section of each kneading disc, as viewed from upstream to downstream in the conveying direction of resin material. The angular positions of band portions 9 are different by 45 degrees between adjacent kneading discs 7. Specifically, supposing angular coordinate 0, as illustrated, band portions 9 of leftmost first kneading disc 71 are positioned at θ=90° and 270°, and band portions 9 of second kneading disc 72 on the right side thereof are positioned at θ=45° and 225°. Similarly, band portions 9 of third kneading disc 73 are positioned at θ=0° and 180°; band portions 9 of fourth kneading disc 74 are positioned at θ=315° and 135°; and band portions 9 of fifth kneading disc 75 are positioned at θ=270° and 90°. Accordingly, as viewed from upstream to downstream in conveying direction of resin material, shaft 3 is rotated in anticlockwise direction R, and band portions 9 of kneading discs 71 to 75 are arranged such that they rotate in the clockwise direction toward the downstream side with regard to the conveying direction. As a result, band portions 9 of kneading discs 71 to 75 work like flight 5a of the first screw element that extends spirally in the clockwise direction, as a whole, and convey resin material downward. Accordingly, mixing screw elements 6 of the present embodiment convey resin material in axial direction X while compressing resin material in the circumferential direction.

In the present embodiment, the angular position of bent part 10 of each kneading disc 7 is shifted relative to the angular position of bent part 10 of adjacent kneading disc 7 on the upstream side by 45 degrees. However, the angular position may be shifted by other angles, for example any angle that is more than 0 degrees and equal to or less than 60 degrees, such as 30 degree or 60 degrees. Specifically, the angular position of bent part 10 of each kneading disc 7 may be shifted relative to the angular position of bent part 10 of adjacent kneading disc 7 on the upstream side by 180/N degrees (where N is an integer equal to or more than 3) in a direction opposite to rotational direction R of shaft 3.

Figure 5:
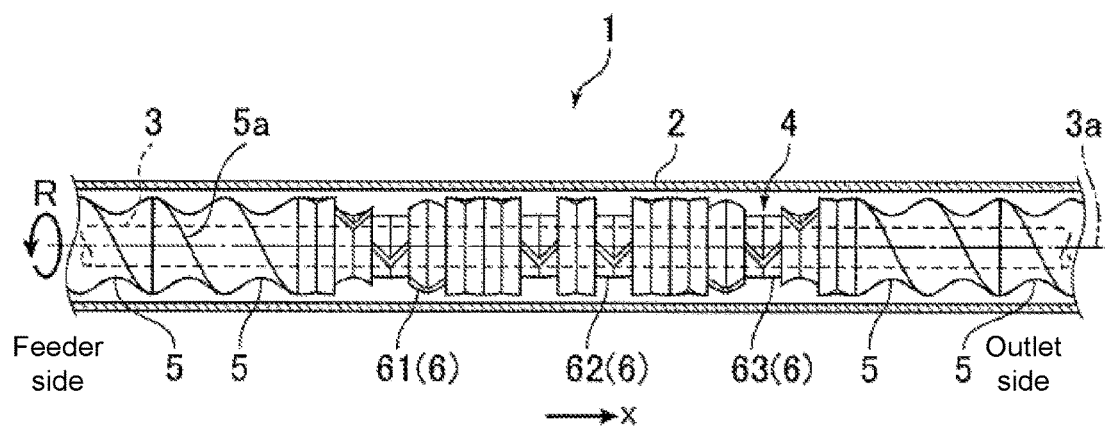
FIG. 5 is a schematic front view of a kneading disc of a second embodiment.

FIG. 5 is a view similar to FIG. 1, illustrating a second embodiment of the present invention. In this embodiment, the configurations of three mixing screw elements are different from each other. Mixing screw element 6 on the left side of FIG. 5, that is, upstream mixing screw element 6 with regard to conveying direction of resin material is referred to as first screw element 61, the mixing screw element at the center of FIG. 5, that is, the central mixing screw element with regard to the conveying direction of resin material is referred to as second screw element 62, and the mixing screw element on the right side of FIG. 5, that is, downstream mixing screw element with regard to the conveying direction of resin material is referred to as third screw element 63.

First screw element 61 has the same configuration as mixing screw element 6a of the first embodiment. On the other hand, in second screw element 62, the angular position of bent part 10 of each kneading disc 7 is shifted relative to the angular position of bent part 10 of adjacent kneading disc 7 on the upstream side by 90 degrees in a direction opposite to rotational direction R of shaft 3. Thus, second screw element 62 does not cause conveying action in axial direction X. On the other hand, in third screw element 63, band portions 9 are distributed in a reverse manner of first screw element 61. As viewed from upstream to downstream in conveying direction of resin material, conveying force occurs from downstream to upstream since band portions 9 are distributed in an anti-clockwise direction. Resin material is conveyed downstream in first screw element 61, and is conveyed upstream in third screw element 63, and a high pressure is applied to the resin material. Thus, the plasticizing and mixing performance can be further enhanced. In third screw element 63, the angular position of bent part 10 of each kneading disc 7 may be shifted relative to the angular position of bent part 10 of adjacent kneading disc 7 on the downstream side by any angle that is more than 0 degrees and equal to or less than 60 degrees, such as 30 degree, 45 degrees or 60 degrees, in rotational direction R of shaft 3. Specifically, the angular position of bent part 10 of each kneading disc 7 may be shifted relative to the angular position of bent part 10 of adjacent kneading disc 7 on the downstream side by 180/N degrees (where N is an integer equal to or more than 3) in rotational direction R of shaft 3.

Figure 6:
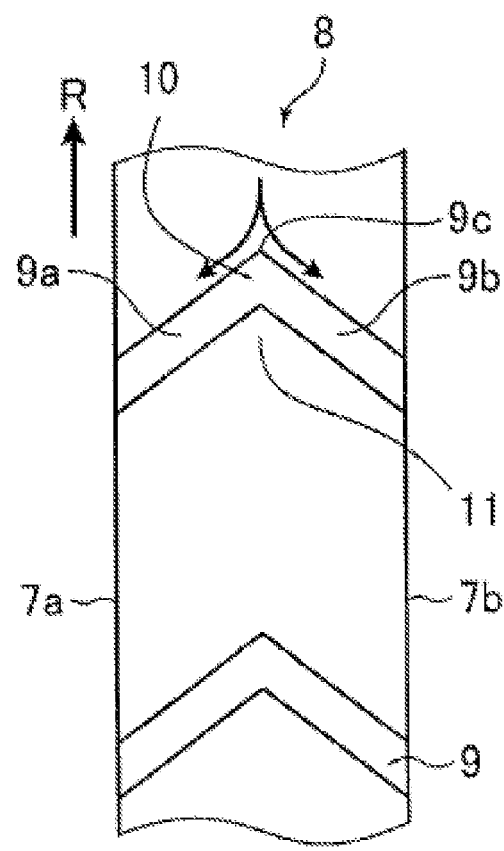
FIG. 6 is a developed view of the outer circumferential surface of a kneading disc of a third embodiment.

FIG. 6 is a view similar to FIG. 3B, illustrating a third embodiment of the present invention. In this embodiment, pocket 11 that is formed by band portion 9 is positioned on the back side of band portion 9 or bent part 10 with regard to rotational direction R of shaft 3. Resin material first comes into contact with protrusion 9c that is positioned on the back side of pocket 11 and then flows such that it diverges from protrusion 9c to right and left sides. In this embodiment, a high distributing action of resin material can be obtained. Although no large shear force is applied to resin material in the distributing action, the resin material receives a large strain due to the distributing action to right and left sides. This also enhances the mixing performance.

EXAMPLE

Figure 7:
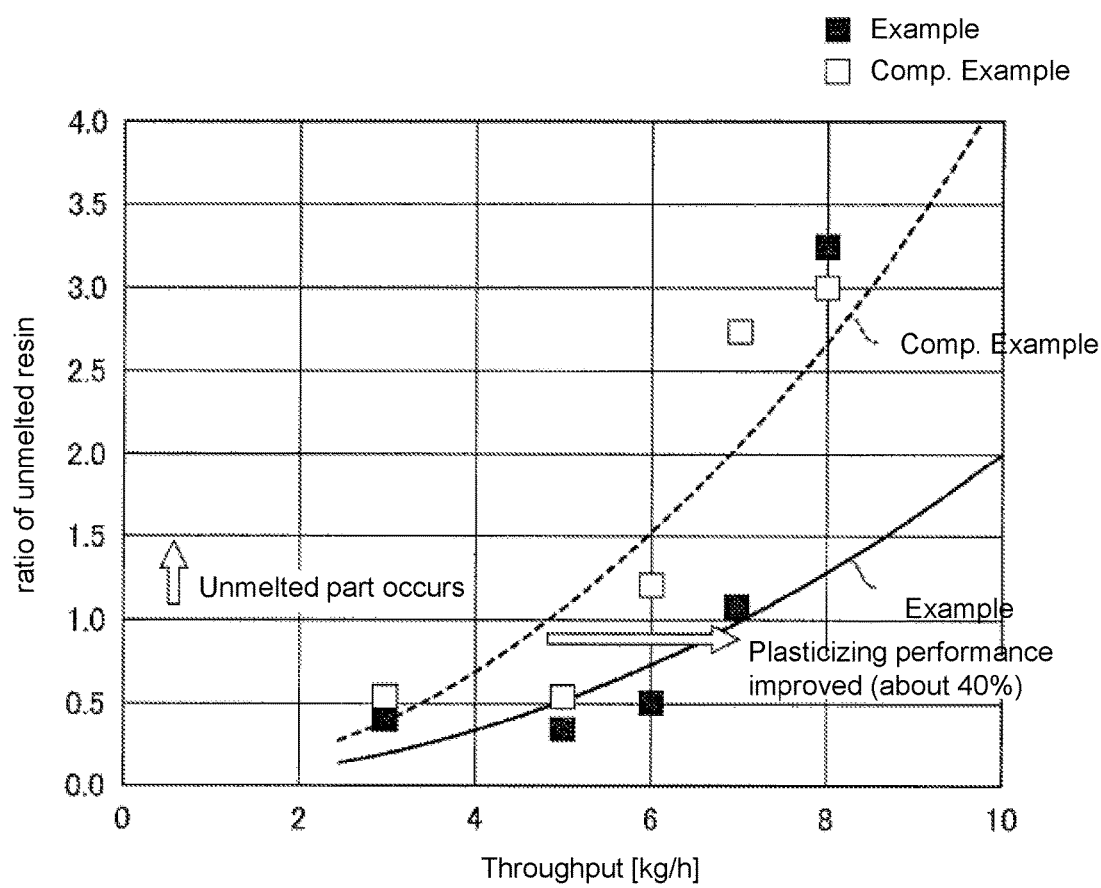
FIG. 7 is a graph showing a relationship between throughput of resin material and a ratio of unmelted resin material in an example and a comparative example.

The mixing performance of kneading disc 7 of the present embodiment was compared to the mixing performance of a kneading disc of a comparative example by using twin screw extruder 1TEX30α manufactured by The Japan Steel Works. The diameter of screw 4 was 30 mm. As resin material, polypropylene J108M manufactured by Prime Polymer Co., Ltd was used. The resin material was fed to the twin screw extruder at a temperature of 30° C., the screw was rotated at 100 rpm, and the temperature of the cylinder was set at 165° C. The example is the same as the embodiment shown in FIG. 2A, and the comparative example has band portions that extend straight in axial direction X in the same manner as kneading disc 107 shown in FIG. 4B. FIG. 7 shows the test results. The horizontal axis indicates the amount of resin material that was extruded from the cylinder per one hour, and the vertical axis indicates a normalized amount of unmelted resin material in the resin material that was extruded. The solid line is an approximate curve of the example, and the dashed line is an approximate curve of the comparative example. Resin material was judged to be bad when the vertical axis exceeded 1 because a certain amount of unmelted resin material existed in that case. As the throughput increases, the ratio of unmelted resin material increases, and the throughput at a time when the vertical axis reaches 1 is the upper limit of the plasticizing performance of the screw. Based on the approximate curves, the example shows 40% larger throughput than the comparative example when the ratio of the unmelted resin material reaches 1. Accordingly, it was confirmed that the amount of resin material that could be plasticized per unit time was increased, or that the plasticizing performance could be enhanced according to the present invention.

The invention claimed is:

1. A kneading disc that is fitted onto a rotatable shaft and that is arranged in a cylinder, the kneading disc comprising an outer circumferential surface that faces the cylinder, the outer circumferential surface, as seen in an axial direction of the cylinder, consisting of:
a pair of first portions each adjacent to an inner surface of the cylinder; and
a pair of second portions each farther apart from the inner surface of the cylinder than the first portions, wherein
each first portion has a single band portion that extends between both ends of the kneading disc with regard to an axial direction of the shaft and that forms a minimum gap with the cylinder, and
the band portion includes at least one bent part.

2. The kneading disc according to claim 1, wherein the band portion includes a first part that extends diagonally relative to the axial direction and a second part that is connected to the first part at the bent part and that extends diagonally with regard to the axial direction in a direction opposite to the first part.

3. The kneading disc according to claim 2, wherein the first and second parts extend in curves.

4. A screw element comprising a plurality of the kneading discs according to claim 1 that are integrated in the axial direction.

5. The screw element according to claim 4, wherein a thickness of the kneading disc is 0.05 to 2 times as large as a maximum diameter of the kneading disc, and a number of the kneading discs is between 2 and 30.

6. The screw element according to claim 4, wherein a pocket is formed by the band portion near the bent part, and the pocket is located in front of the bent part with regard to a rotational direction of the shaft.

7. The screw element according to claim 4, wherein a pocket is formed by the band portion near the bent part, and the pocket is located behind the bent part with regard to a rotational direction of the shaft.

8. The kneading disc according to claim 1, wherein
the kneading disc has an ellipse shape having a long axis intersecting the pair of first portions and a short axis that is shorter than the long axis and intersects the pair of second portions, and
the pair of first portions intersected by the long axis are disposed substantially in parallel to the short axis.

9. A kneading disc that is fitted onto a rotatable shaft and that is arranged in a cylinder, the kneading disc comprising an outer circumferential surface that faces the cylinder, the outer circumferential surface comprising:
a first portion that is adjacent to an inner surface of the cylinder as seen in an axial direction of the cylinder; and
a second portion that is farther apart from the inner surface of the cylinder than the first portion, as seen in the axial direction,
wherein the outer circumferential surface has a band portion that extends between both ends of the kneading disc with regard to an axial direction of the shaft and that forms a minimum gap with the cylinder,
wherein the band portion is only provided on the first portion and is a single band portion, and the band portion includes at least one bent part,
wherein the band portion includes a first part that extends diagonally relative to the axial direction and a second part that is connected to the first part at the bent part and that extends diagonally with regard to the axial direction in a direction opposite to the first part,
wherein the first and second parts extend straight, and the first and second parts form acute angles with the axial direction, wherein the acute angles are equal to or more than 30 degrees.

10. An extruder comprising:
a screw that is partitioned into a plurality of screw elements;

a rotatable shaft that is fitted into the plurality of screw elements; and a cylinder in which the screw is arranged, wherein the plurality of screw elements includes a first screw element, a second screw element, and a third screw element, each comprising a plurality of kneading discs that are integrated in an axial direction of the cylinder, wherein each of the plurality of kneading discs is fitted onto the shaft and is arranged in the cylinder, each kneading disc comprising an outer circumferential surface that faces the cylinder, the outer circumferential surface has a band portion that extends between both ends of the kneading disc with regard to an axial direction of the shaft and that forms a minimum gap with the cylinder, wherein the band portion includes at least one bent part, wherein the first screw element is arranged upstream in a conveying direction of resin material, the second screw element is arranged downstream of the first screw element, and the third screw element is arranged downstream of the second screw element, wherein, as viewed from upstream to downstream in the conveying direction of the resin material, in the first screw element, an angular position of the bent part of each kneading disc is shifted relative to an angular position of the bent part of an adjacent kneading disc on a downstream side by an angle that is more than 0 degrees and equal to or less than 60 degrees in a direction opposite to a rotational direction of the shaft, in the second screw element, an angular position of the bent part of each kneading disc is shifted relative to an angular position of the bent part of an adjacent kneading disc on an upstream side by 90 degrees in a direction opposite to the rotational direction of the shaft, and in the third screw element, an angular position of the bent part of each kneading disc is shifted relative to an angular position of the bent part of an adjacent kneading disc on an upstream side by an angle that is more than 0 degrees and equal to or less than 60 degrees in a rotational direction of the shaft.

* * * * *